(12) United States Patent
Estevadeordal et al.

(10) Patent No.: US 8,629,978 B1
(45) Date of Patent: Jan. 14, 2014

(54) CURVED LASER SHEET FOR CONFORMAL OPTICAL DIAGNOSTICS

(75) Inventors: Jordi Estevadeordal, Saratoga Springs, NY (US); Christopher Marks, Waynesville, OH (US); Rolf Sondergaard, Beavercreek, OH (US); James M. Wolff, Huber Heights, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 12/985,160

(22) Filed: Jan. 5, 2011

Related U.S. Application Data

(60) Provisional application No. 61/292,264, filed on Jan. 5, 2010.

(51) Int. Cl.
*G01P 3/36* (2006.01)
(52) U.S. Cl.
USPC ............................................ 356/28; 356/28.5

(58) Field of Classification Search
USPC ............. 356/3.01–3.15, 4.01–4.1, 5.01–5.15, 356/6–22
See application file for complete search history.

(56) References Cited

U.S. PATENT DOCUMENTS

| 3,809,480 | A | * | 5/1974 | Somerville et al. | 356/338 |
| 5,515,158 | A | * | 5/1996 | Heineck | 356/129 |
| 5,859,704 | A | * | 1/1999 | Fric et al. | 356/320 |
| 2008/0166023 | A1 | * | 7/2008 | Wang | 382/107 |

* cited by examiner

*Primary Examiner* — Luke Ratcliffe
(74) *Attorney, Agent, or Firm* — AFMCLO/JAZ; Fredric Sinder

(57) ABSTRACT

Three-dimensional surface illumination using curved laser sheets is described for optical flow measurements over conformal curved surfaces. The illumination method is applicable to many different optical-based flow visualization and measurement techniques, particularly for particle image velocimetry. An alignment sheet increases the accuracy of determining the position and movement of particles used in optical-base fluid flow techniques.

2 Claims, 4 Drawing Sheets

CURVED LASER SHEET FOR CONFORMAL OPTICAL DIAGNOSTICS

CROSS REFERENCE TO RELATED PATENT APPLICATION

This application claims priority under 35 U.S.C. §119(e) from U.S. provisional application 61/292,264, filed Jan. 5, 2010, and titled "Curved Laser Sheet for Conformal Optical Diagnostics." The invention description contained in that provisional application is incorporated by reference into this description.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to fluid flow analysis, particularly fluid flow measurement and visualization techniques, and more specifically to improved laser sheets used as part of those techniques.

Particle image velocimetry (PIV) is a particularly useful technique for measuring and visualizing fluid flow. The PIV process suspends tiny tracer particles in a fluid, usually air, and illuminates them with a laser sheet plane. Successive images of the illuminated particles are made, usually with a digital camera, and the successive images can be combined to both visualize and, very importantly, measure the movement of the fluid.

PIV is most often used for analyzing fluid flow near curved surfaces, such as blades and other components of jet engines and other turbomachines.

Fluid flows that are normal, or perpendicular, to a curved surface can usually be easily measured using PIV techniques using a flat laser sheet. Fluid flows parallel to curved surfaces, however, are much more difficult to measure because, among other problems, the distance between the surface and the laser sheet in successive images changes. This is a particular problem for measuring velocimetry.

It is seen, therefore, that there is a need for improved techniques for measuring fluid flows around curved surfaces.

SUMMARY OF THE INVENTION

The present invention provides improved laser sheets that are curved to conform to curved surfaces and alignment techniques for improving measurements using curved laser sheets.

A unique discovery of the present invention is that a curved laser sheet can be generated to closely conform to a surface and provide improved results for fluid flow visualization and measurement.

Another unique discovery of the present invention is that an alignment sheet having a pattern on its surface can be used to more simply and more accurately determine fluid flow measurements using a curved laser sheet.

Accordingly, the invention is directed to fluid flow test apparatus components and methods for using that generate a curved light sheet, including an alignment sheet and its use for improving measurement accuracy.

DETAILED DESCRIPTION

Additional details of the work described in this description are in Christopher Marks, Rolf Sondergaard, Mitch Wolff and Jordi Estevadeordal, "PIV Investigation of a Highly-Loaded LPT Blade Using a Curved Laser sheet," 47th AIAA Aerospace Sciences Meeting, AIAA-2009-0301, Jan. 5, 2009, a copy of which is included as part of the cross-referenced provisional patent application incorporated by reference into this description.

Further additional details of the work described in this description are in Jordi Estevadeordal, Christopher Marks, Rolf Sondergaard and Mitch Wolff, "Curved Laser sheet for Conformal Surface Flow Diagnostics," Experiments in Fluids, DOI 10.1007/s00348-010-0967-0, Aug. 28, 2010, which is incorporated by reference into this description.

The present invention provides techniques for obtaining illumination in planes that are conformable to curved surfaces in three-dimensional (3D) spaces. It can be applied to optical flow measurement techniques such as particle image velocimetry (PIV). It can also be applied to other flow or combustion diagnostics techniques that currently use planar-sheet illumination. The example embodiments focus on PIV because it is currently one of the strongest diagnostic tools for testing complex flow fields due to its ability to provide instantaneous flow field data in two-dimensional (2D) planes. Experimentally obtained 2D velocity flow fields are useful for both qualitative and quantitative understanding of complex flows. Data can be obtained quickly and in a large spatial area providing experimental data that can be directly compared to computational fluid dynamics (CFD) results.

The example embodiments in this description demonstrate use of a curved laser sheet for flow diagnostics around a curved wall. The principle is demonstrated by flow visualization and PIV around an airfoil to capture flow details around and near the curved wall and curved flow stream surfaces. The example embodiments are primarily applied to a 2D airfoil having curvature in only one dimension, and the experimental setup and post processing are comparable to that of 2D PIV. The curved laser sheets allow high fidelity measurement of flow velocity in areas and viewing planes that have previously been difficult. The present demonstration employs standard optical components such as a combination of cylindrical lenses or curved mirrors. Customized optics designs will allow using fewer optical elements and could deliver more complex curved laser shapes.

Figure 1:
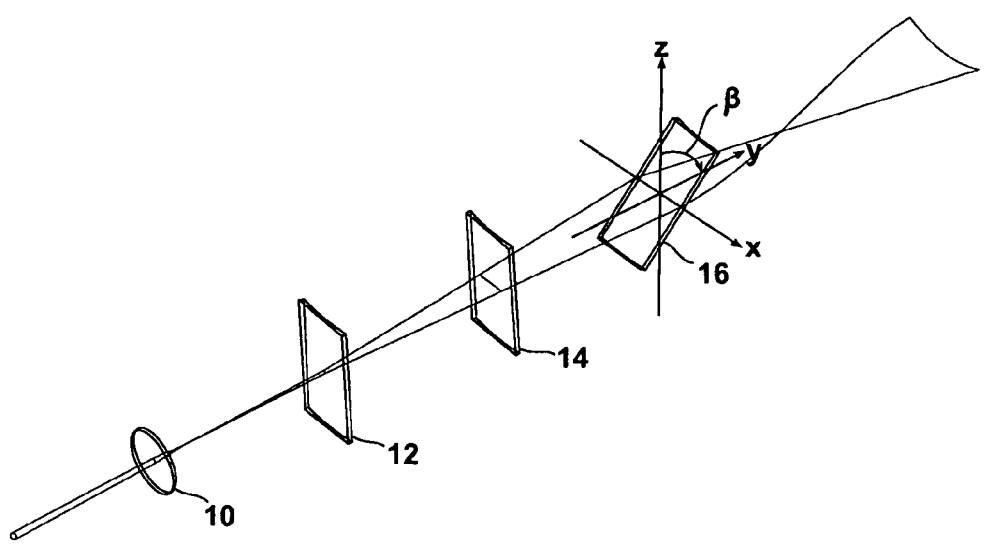
FIG. 1 is a schematic diagram of an example embodiment of optical components for generating a curved laser sheet according to the teachings of the present invention.

FIG. 1 is a schematic diagram of an example embodiment of optical components for generating a curved laser sheet according to the teachings of the present invention. Setup of the illumination system differs from traditional PIV in that it requires generation of a laser sheet that is curved to follow or conform to the wall curvature or flow streamlines along a curved surface. This can be accomplished by using a modified laser sheet forming lens system, as shown here, or by designing an optical lens or mirror system to form a given shape. The laser sheet curvature effect is similar to that of a flat laser sheet intersecting not normally onto optical windows with curvature. If an application requires a simple conical-shaped laser sheet, a series of sheet-forming lenses typical of those used to generate a flat laser sheet can be used with the addition of a cylindrical lens rotated at various angles in the optical path. The cylindrical lens inclinations, distances, and physical properties (such as thickness and focal length) determine the shape and thickness of the curved sheet. A bi-complex spherical lens 10 is used to reduce the diameter of a laser beam. Next, a series of negative focal length cylindrical lenses 12 and 14 expand the laser beam into a planar sheet. In a planar PIV experiment, adjusting the focal lengths and placement of lenses 10, 12 and 14 sets the laser sheet thickness and width. In order to generate a curved sheet, an additional tilted convex cylindrical lens 16 is added. The orientation of additional lens 16 determines the shape of the sheet. Tilting lens 16 by an angle β in the x-axis will generate a curve in the sheet related to the geometry of the cylindrical lens. Rotating already tilted lens 16 by an angle about the z-axis will adjust the area of the curve that is illuminated and allow limited manipulation of the curvature of the sheet. The rotation of lens 16 about the z-axis does not adjust the actual curvature. It creates an area of lower curvature which could be illuminated and used as needed.

A single customized optical element could also be designed to deliver curved-sheet shapes of constant or variable thickness. Since these curved laser sheets allow tracking of curved shapes in space, they can be used for illumination of flow regions such as boundary layer or wall flows in conformal surfaces of airfoils, blades and circumferential planes in turbomachinery. In addition, since moving the optical elements can produce changes in the laser curvature, the motion of surfaces (e.g., wing motions in flying insects or a UAV) could also be tracked in time.

Figure 2:
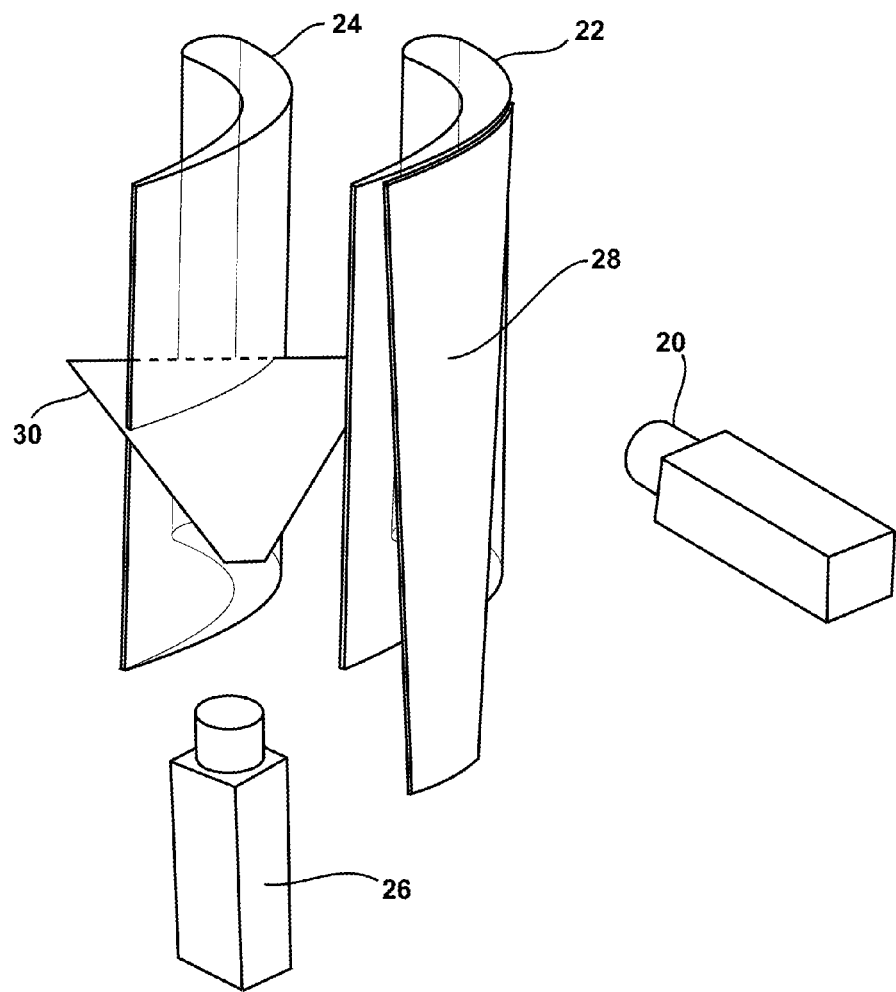
FIG. 2 is a illustrative diagram of an example embodiment of the present invention using a curved laser sheet as part of a PIV analysis of flow around the suction surface of a linear cascade of low pressure (LP) turbine blades.

In an example embodiment of application of the teachings of the present invention, a laser sheet was curved parallel to the wall profile at the aft end of the suction side of a LPT blade in a 2D linear cascade at low Reynolds number. A schematic of the experimental arrangement is shown in FIG. 2. PIV data was acquired in the blade normal direction using a flat laser sheet and in the span-wise viewing direction by a curved laser sheet. The laser was a New Wave Solo 120XT, its beam was split into two paths, and double-exposure images were recorded with PCO 1600 cameras. Off-the-shelf optical elements consisting of a series of spherical and cylindrical lenses were arranged to generate a curved laser sheet 28 that closely matched the suction surface blade profile from 60 to 90% axial chord in the field of view. A span-wise viewing camera lens 20 was a 105 mm set at f/2.8 and located ~100 cm away from blade 22 (between lens 20 and a blade 24 part of a cascade of similar blades). Camera 26 observes a blade normal view flat planar sheet 30. The optical path passed through two flat 1.25-cm-thick LEXAN sheets from the wind tunnel outer wall and a cascade tailboard. The FOV was 124×93 mm. Curved laser sheet 28 was brought into focus in the camera by employing a large F-number (small aperture), and a grid on the blade profile was used for magnification calibration across the field of view (FOV). As discussed earlier, an additional source of uncertainty is introduced by magnification factor variation across the FOV, which must be accurately accounted for when calculating velocity from the correlated displacement field.

In these example embodiments, the curvature of the 3D surface is only in one dimension and not very severe, and the object plane can be readily projected into the image plane and the magnification variations readily established. The optical setup was also designed so that working distance (WD), field-of-view (FOV) and depth-of-field (DOF) yielded the object plane in focus. Stereo-PIV-like techniques can be used to bring the plane in focus if necessary. Complex 3D shapes should require complex unwrapping image registration techniques such as the photogrammetric approaches used in applications of pressure- and temperature-sensitive paint diagnostics on 3D surfaces. In most of the described example embodiments, a grid pasted on the airfoil sufficed to calculate the magnification on the FOV.

Figure 3:
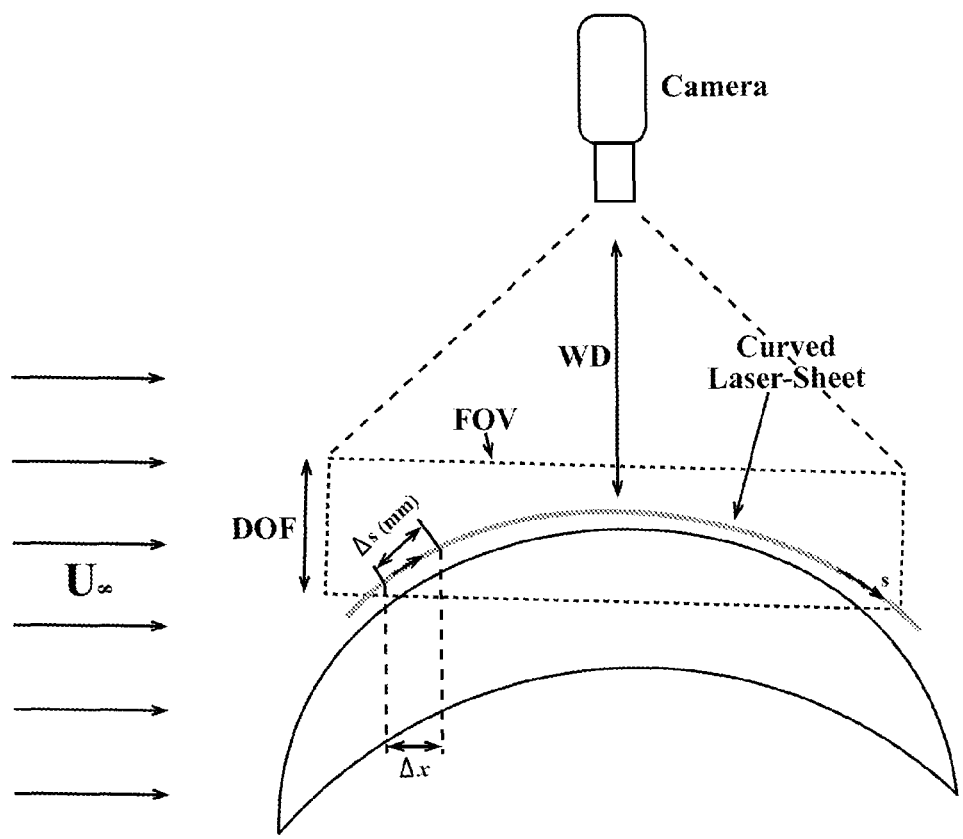
FIG. 3 is a schematic diagram of an example embodiment of using a curved laser sheet according to the teachings of the present invention for fluid flow analysis.

FIG. 3 is a schematic diagram of an example embodiment of using a curved laser sheet according to the teachings of the present invention for fluid flow analysis.

In the setup shown Δx is the corresponding displacement in pixels in the image plane and Δs is the displacement in the curved plane illuminated by the laser. Velocity $\hat{S}$ in the curved plane is calculated by:

$$\hat{S} = \frac{\Delta x}{\Delta t \cdot M}$$

where Δx is the displacement in the image plane, and Δt·is the time between the two images (cross correlation PIV is implied). M is the magnification factor which is a function of x and given by:

$$M(x) = \frac{\Delta x}{\Delta s}$$

where Δs is incremental movement in the laser sheet plane. The units of M are chosen to relate pixel units to physical units (e.g., mm).

The relationship between $\hat{S}$ and velocity u and v (standard coordinates in object normal direction) is:

$$|V| = \sqrt[2]{u^2 + v^2} = \hat{S}$$

assuming two dimensional flow.

For a general distorted 3D shape, the camera optics path could include optical elements that compensate for the otherwise out-of-focus image plane at the expense of magnification distortions, similar to an extension of the Scheimpflug arrangement used in stereo PIV or when viewing object planes at an angle. The example embodiment presented here does not use arrangements such as the Scheimpflug arrangement of stereo or off-angle views mostly because the plane curvature is not large and it is in focus (large enough depth of field).

A concern of the described technique is related to the effect of out-of-plane motion and its off-normal view. In one aspect, the curved laser sheet minimizes the out-of-plane motion precisely because it is designed to follow the stream surfaces of the flow. This is an advantageous scenario, especially when compared to laser sheet arrangements that have laser sheet normal to the main flow, as some stereo-PIV use. Nonetheless, turbulence, for example, generates 3D motions and out-of-plain motion happens. As with PIV designs, the combination of laser sheet thickness and the time between the two frames should be such that particles do not move out of the laser sheet. Still, extreme scenarios can occur where the off-normal view can severely distort the image particle positions.

Although the benefits of the technique can be readily appreciated in the qualitative flow visualization form, its real usefulness resides in its potential for quantitative measurements, such as velocimetry. In the described example embodiments, velocimetry is based on using PIV, and the technique accuracy can be approached in an equivalent manner to PIV techniques that use a flat planar sheet, with the exception of additional uncertainty due to magnification factor variation in the FOV, a typical situation encountered in stereo-PIV and off-axis PIV. The magnification factor then relates particle displacement in the image plane to displacement in the curved plane and must be accurately accounted for when calculating velocity from the correlated displacement field. In general, a conformal mapping would be needed. In these example embodiments, the curvature is only in one dimension and magnification correction can be related more straightforward. When needed, advanced 3D image registration algorithms and accuracy studies should be performed; many of these algorithms can be found, for example, in 3D surface diagnostic studies and applications such as pressure sensitive paints. Many of the algorithms used in these techniques include very accurate and robust correlation-based techniques. Correlation techniques are also the main calculation tool in PIV, making the data very accurate.

Figure 4:
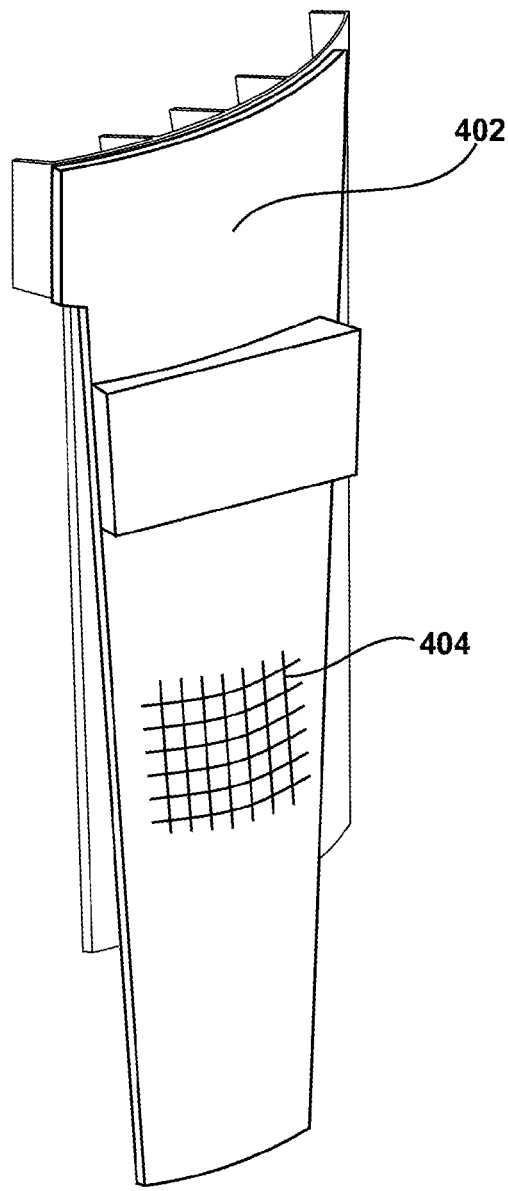
FIG. 4 is a schematic diagram of an example embodiment of an alignment sheet according to the teachings of the present invention.

FIG. 4 shows a schematic diagram of an example embodiment of an alignment sheet 402 according to the teachings of the present invention. Alignment sheet 402 is shaped almost identically to the shape of laser sheet 210 in FIG. 2 and includes an arbitrary pattern 404, only a portion of which is shown in this view. Alignment sheet 402 is placed inside a test apparatus where a fluid flow test is to be run in the same position, or positions, where a generated laser sheet will be used during an actual test. The same imaging apparatus, typically digital cameras, to be used in a later test, are used to image pattern 404 on sheet 402 so that, when an actual test is performed, the precise position of any illuminated particles, particularly in relation to displacement from a surface used in the actual test, can be determined by reference to the alignment images.

The example embodiment techniques can be used for measurements in curved planes aligned with conical surfaces or stream surfaces. Commercial optical programs can be used to aid in the inverse design of the sheet-forming system and will certainly make the experimental setup easier in practice.

Often the focus of studies on transitional flow around low-pressure turbine (LPT) blades is on the flow behavior in the viscous region near the wall. The walls are curved in shape and attached laminar, transitional and turbulent boundary layer streamlines primarily follow the shape of the curved wall. Curved walls make it difficult to use traditional PIV in the span-wise viewing direction near the wall. Several researchers have successfully applied 2D planar PIV in the span-wise direction plane parallel to the suction side of an airfoil or flat plate with adverse pressure gradient by taking advantage of the low curvature of the blade in the region of interest. The area of interest on the suction side of LPT blades, which have large turning angles, is often near the point of highest curvature that makes imaging in the span-wise direction using a planar sheet difficult. The conformal surface PIV technique using a curved laser sheet allows span-wise imaging very near the surface of a highly loaded LPT blade.

Two-dimensional PIV is the most common and simplest to setup, but provides velocity components in only two directions. In an attempt to better understand the three-dimensional (3D) nature of complex flows and obtain the third velocity component, a variety of techniques have been devised. Examples include stereoscopic PIV, volumetric PIV, holographic PIV and dual-plane PIV. Most of these techniques require specialized calibration or image correlation methods beyond those typically used for 2D single-plane PIV.

The conformal surface technique according to the teachings of the present invention is applicable to 3D surfaces. The example embodiments in this description improve the study of internal aerodynamics flows where axisymmetric or circumferential plane diagnostics will benefit from its conformal surface technique. However, because 3D spatial laser shapes could be readily visualized seeding flows with particles, this technique is not limited to simple surfaces and could be used for tracking complex 3D surfaces such as complex blade and wing shapes; and also tracking moving 3D surfaces, such as those of unmanned air vehicles (UAV) wings, in time. Motion of the optical components that form the curved laser sheet produces changes in the curvature shape and can change the illuminated 3D space and also change it in time. A more complex camera system including customized optics, several views, and optional high-speed capabilities would be needed for imaging.

The disclosed new approach for fluid flow analysis techniques successfully demonstrate the use of curved laser sheets. Although the disclosed example embodiments are specialized, their teachings will find application in related areas of optical analysis.

Various modifications to the invention as described may be made, as might occur to one with skill in the art of the invention, within the scope of the claims. Therefore, all contemplated embodiments have not been shown in complete detail. Other embodiments may be developed without departing from the spirit of the invention or from the scope of the claims.

We claim:

1. Test apparatus components for fluid flow analysis, comprising:
   (a) a laser light source;
   (b) optical elements for shaping a beam of laser light into a curved light sheet; and,
   (c) an alignment sheet having at least part of its surface about the same shape as a light sheet to be later used for fluid flow analysis, the alignment sheet having a pattern on its surface for calibrating other fluid flow analysis test apparatus components for distance and position of particles to be later flowed through the light sheet.

2. A test apparatus component for fluid flow analysis over a surface, comprising an alignment sheet having at least part of its surface about the same shape as a laser sheet to be later used for fluid flow analysis, the alignment sheet having a pattern on its surface for calibrating other fluid flow analysis test apparatus components for distance and position of particles to be later flowed through the laser sheet.

* * * * *